(12) United States Patent
Gonzalez Escudero et al.

(10) Patent No.: US 12,228,668 B2
(45) Date of Patent: Feb. 18, 2025

(54) METHOD, SYSTEM AND COMMUNICATION DEVICE FOR DETERMINING A POSITION OF THE DEVICE

(71) Applicant: Telefonaktiebolaget LM Ericsson (publ), Stockholm (SE)

(72) Inventors: Alberto Gonzalez Escudero, Linköping (SE); Niklas Blomqvist, Linköping (SE); Ulf Händel, Norsholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 17/762,114

(22) PCT Filed: Sep. 24, 2019

(86) PCT No.: PCT/SE2019/050915
§ 371 (c)(1),
(2) Date: Mar. 21, 2022

(87) PCT Pub. No.: WO2021/061030
PCT Pub. Date: Apr. 1, 2021

(65) Prior Publication Data
US 2022/0349982 A1    Nov. 3, 2022

(51) Int. Cl.
*H04W 4/02* (2018.01)
*G01S 5/00* (2006.01)
(Continued)

(52) U.S. Cl.
CPC .......... *G01S 5/0264* (2020.05); *G01S 5/0036* (2013.01); *H04W 64/006* (2013.01); *G01S 2205/008* (2013.01)

(58) Field of Classification Search
CPC ................ G01S 5/0264; G01S 5/0036; G01S 2205/008; H04W 64/006
See application file for complete search history.

(56) References Cited

U.S. PATENT DOCUMENTS

2010/0225929 A1    9/2010  Yeh et al.
2013/0088725 A1*   4/2013  Yeh ........................... G01S 5/16
                                                          356/615
(Continued)

FOREIGN PATENT DOCUMENTS

| CN | 110012416 A | 7/2019 |
| JP | 2012088073 A | 5/2012 |
| JP | 2014185908 A | 10/2014 |

OTHER PUBLICATIONS

Yanhong, Liu, "Research on Sun Shadow Positioning Problems Based on Mathematical Models", Journal of Nanyang Normal University, vol. 15, No. 12, Dec. 31, 2016, 1-4.
(Continued)

*Primary Examiner* — Moustapha Diaby
(74) *Attorney, Agent, or Firm* — Murphy, Bilak & Homiller, PLLC

(57) ABSTRACT

A method performed by a system (120) for determining a position of a device (140) connected to a communication network (100) is disclosed. The method comprises obtaining a geographical area for the device based on a first position-estimation service, obtaining information on luminosity on the device over a time period, and determining a second position estimation for the device (140) based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period. Disclosed is further a corresponding system and a position-determining method performed by a communication device.

29 Claims, 6 Drawing Sheets

(51) Int. Cl.
    *G01S 5/02*     (2010.01)
    *H04W 64/00*    (2009.01)

(56)                    References Cited

U.S. PATENT DOCUMENTS

2015/0094102 A1    4/2015  Jung et al.
2018/0196972 A1    7/2018  Lu et al.
2019/0063933 A1    2/2019  Zaum et al.

OTHER PUBLICATIONS

3GPP, "3GPP TS 36.355 V15.3.0", 3rd Generation Partnership Project; Technical Specification Group Radio Access Network; Evolved Universal Terrestrial Radio Access (E-UTRA); LTE Positioning Protocol (LPP) (Release 15), Mar. 2019, 1-223.
3GPP, "3GPP TS 38.305 V1.0.0", 3rd Generation Partnership Project; Technical Specification Group Radio Access Network; NG Radio Access Network (NG-RAN); Stage 2 functional specification of User Equipment (UE) positioning in NG-RAN (Release 15), Mar. 2018, 1-54.
Unknown, Author, "IMU Sensor Based Positioning", 3GPP TSG-RAN2 Meeting #99bis, R2-1711476, Intel Corporation, Ericsson, Sony, Prague, Czech Republic, Oct. 9-13, 2017, 7 pages.

\* cited by examiner

METHOD, SYSTEM AND COMMUNICATION DEVICE FOR DETERMINING A POSITION OF THE DEVICE

TECHNICAL FIELD

The present disclosure relates generally to methods, systems and communication devices for determining a position of the device, the device being connected to a communication network. The present disclosure further relates to computer programs and carriers corresponding to the above methods, systems and devices.

BACKGROUND

Wireless positioning systems aim to estimate positions of devices, such as communication devices by using wireless network infrastructures. With the rapidly increasing demand for wireless communication network services, one of the fastest growing segments is Location Based Services (LBS). The range of LBS applications is expanding quickly and positioning in wireless communication networks is an increasing use case. With the increased demand for sensor networks including Internet of Things (IoT) devices, cheap, scalable, and energy efficient methods for positioning these IoT devices are critical.

In response to the needs for positioning in wireless communication networks, second and third generation networks such as Code Division Multiple Access (CDMA), Wideband CDMA (WCDMA) and Global System for Mobile communication (GSM) have added support for several positioning technologies. Such positioning technologies range from simpler network-based schemes to complex trilateration and satellite-based solutions. The current Long Term Evolution (LTE) standards support multiple wireless communication device based positioning techniques such as Assisted Global Navigation Satellite Systems (A-GNSS). There are also network-based positioning techniques such as, Observed Time Difference of Arrival (OTDOA), Cell ID (CID), and Enhanced Cell ID (ECID).

CID uses the information of an ID of a cell that the wireless communication device, aka User Equipment (UE), camps on to get a quick position estimation of the UE. The position of the UE is estimated to be the position of the base station that the UE is connected to, and thus the position estimation has fairly low accuracy.

ECID positioning is an improvement from CID. In ECID, the Round Trip Time (RTT) between the base station and the UE is used in conjunction with Reference Signals Received Power (RSRP), which is a measurement of the received power level at the UE, to estimate the distance to the UE. Additionally, the network can also use Angle of Arrival (AoA) of signals received by the base station from the UE to provide directional information to the UE. ECID is able to provide better accuracy in comparison to CID, but at the cost of a more complex system.

A-GNSS is a technique where Global Navigation Satellite Systems like the Global Positioning System (GPS) is used. With standalone GNSS, a receiver in the UE is solely responsible for both receiving and computing its location. Through a search process, the receiver must acquire satellite signals and proceed to calculate its position. This process can be very expensive in terms of processing power in the UE and delays, but provides very high accuracy. In A-GNSS, the process of acquiring satellite signals is sped up by data provided by the network.

Observed Time Difference of Arrival (OTDOA) positioning is a technique where the UE measures the time differences in downlink signals from multiple base stations. With the knowledge of the base stations' positions and the time differences, the network can calculate an estimated position of the UE. The more base stations that the UE is connected to, the better accuracy. OTDOA provides better accuracy in comparison to ECID, but worse in comparison to A-GNSS.

Sensor-based positioning techniques utilize data of sensors provided at the UE to acquire positioning information of the UE. A location server can request sensor information for sensor-based methods from the UE. This information could be movement of a UE, which the location server can calculate with data from a motion sensor. Other sensors that are mentioned are barometers, proximity sensors, or distance sensors. It is also possible for the location server to provide assistance data, to be able to assist calculations of altitude or other more complex calculations.

In for example urban scenarios, buildings and other obstacles affect the measurement of wireless signal strength, which negatively affects positing systems such as OTDOA that relies on signal measurements. The complexity, delays, and other drawbacks that come from standardized techniques for positioning, means they are not always applicable for use in all systems. Further, the cost of a GNSS receiver is too expensive for using in for example IoT devices. Further, sensors-based positioning, relying on such as movement sensors and barometers, does not provide accurate positioning even when used together with other positioning methods. Consequently, there is a need for a new method for determining positions of devices, which method is energy efficient, cost efficient and which can determine a device position accurately.

SUMMARY

It is an object of the invention to address at least some of the problems and issues outlined above. It is possible to achieve these objects and others by using methods, systems and communication devices as defined in the attached independent claims.

According to one aspect, a method performed by a system for determining a position of a device connected to a communication network is provided. The method comprises obtaining a geographical area for the device based on a first position-estimation service, and obtaining information on luminosity on the device over a time period. The method further comprises determining a second position estimation for the device based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period.

According to another aspect, a position-determining method performed by a communication device connected to a communication network is provided. The communication device has a luminosity sensor. The method comprises determining luminosity at the luminosity sensor over a time period, and sending information on the determined luminosity over the time period to a system connected to the communication network, wherein the determined and sent information on luminosity is suitable for determining a position of the communication device.

According to another aspect, a system configured for determining a position of a device connected to a communication network is provided. The system comprises a processing circuitry and a memory. The memory contains instructions executable by said processing circuitry, whereby the system is operative for obtaining a geographical area for the device based on a first position-estimation service, obtaining information on luminosity on the device over a time period, and determining a second position estimation for the device based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period.

According to another aspect, a communication device configured for connection to a communication network is provided. The communication device has a luminosity sensor. The communication device comprises a processing circuitry and a memory. The memory contains instructions executable by said processing circuitry, whereby the communication device is operative for determining luminosity at the luminosity sensor over a time period, and sending information on the determined luminosity over the time period to a system connected to the communication network, wherein the determined and sent information on luminosity is suitable for determining a position of the communication device.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, embodiments of the invention deals with improving the accuracy in position determination of a device of a communication network by first using a comparatively coarse position estimation method for obtaining a geographical area in which the device is situated. Thereafter, luminosity variation over a time period for the device is obtained, and a 3D model is used of the obtained geographical area, comprising modelled 3D objects in the area, such as buildings, and a model of the sun's movement over the sky during the time period. "Moving" shadows will be generated in the 3D model from the model of the sun moving during the time period and shining onto the 3D objects. The luminosity variations obtained for the real device are compared to the moving shadows in the 3D model in order to detect a similar luminosity variation in positions of the model, or as generated by the 3D objects, as the obtained luminosity variations from the real device. When a match is found this is a signal of a possible position of the device or a possible 3D object that the device may be behind.

Figure 1:
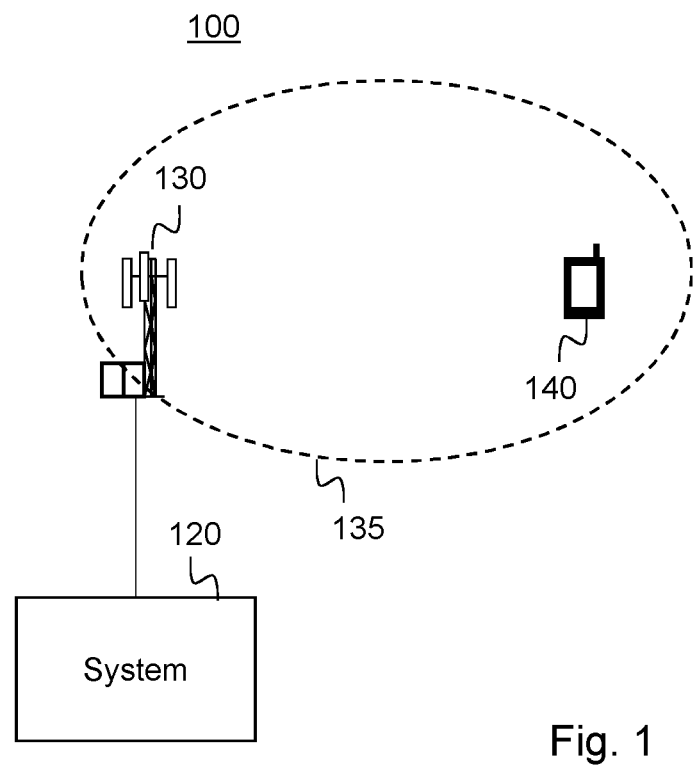
FIG. 1 is a schematic block diagram of a wireless communication network in which the present invention may be used.

FIG. 1 shows an example of a wireless communication network 100 in which the present invention may be used. The wireless communication network comprises a radio access network node 130 that is in, or is adapted for, wireless communication with a wireless communication device 140. The radio access network node 130 provides radio coverage to a geographical cell 135 in which the wireless communication device 140 resides. The radio access network node 130 is further connected to a system 120 for determining the position of the wireless communication device 140, according to embodiments. In alternative embodiments, the system for determining the position of the device may reside in the device itself.

Figure 2:
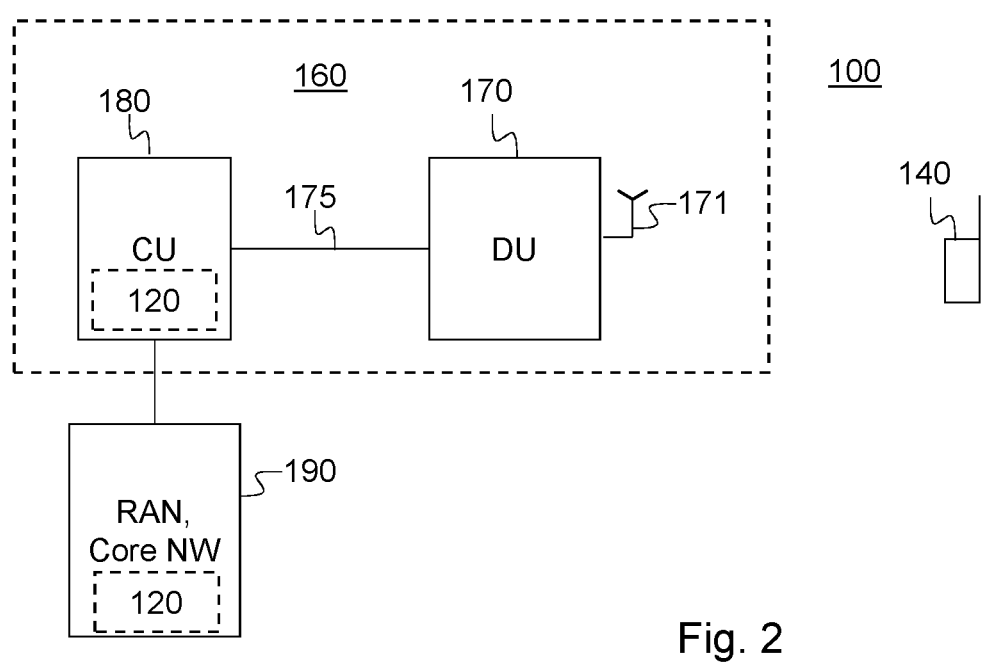
FIG. 2 is a schematic block diagram of another wireless communication network in which the present invention may be used.

FIG. 2 shows another example of a wireless communication network 100 in which the present invention may be used. This network comprises a base station system 160 comprising a Central Unit (CU) 180 and a distributed unit (DU) 170 interconnected via e.g. a wire. The CU 180 handles higher layers and communication towards the core network, whereas the DU 170 handles lower layers and communication towards the wireless communication device 140. Further, an antenna 171 is situated at or close to the DU. The CU 180 is further connected to other radio access network (RAN) nodes and to a core network 190. A system 120 for determining the position of a device such as the wireless communication device 140, according to embodiments, may be situated for example in the CU 180 or in the RAN or in the core network 190. In alternative embodiments, the system for determining the position of a device may reside in the device itself, or it may be realized as a cloud solution. The device for which the position may be determined may be, except for the wireless communication device 140, also the DU 170 or the antenna 171.

The wireless communication network 100 may be any kind of wireless communication network that can provide radio access to wireless communication devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The radio access network node 130 may be any kind of network node that provides wireless access to a wireless communication device 140 alone or in combination with another network node. Examples of radio access network nodes 130 are a base station (BS), a radio BS (RBS), a base transceiver station, a BS controller, a network controller, a Node B (NB), an evolved Node B (eNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless communication device 140 may be any type of device capable of wirelessly communicating with a radio access network node 130 or a DU 170 using radio signals. For example, the wireless communication device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE), an Internet of Things (IoT) device etc.

Figure 3:
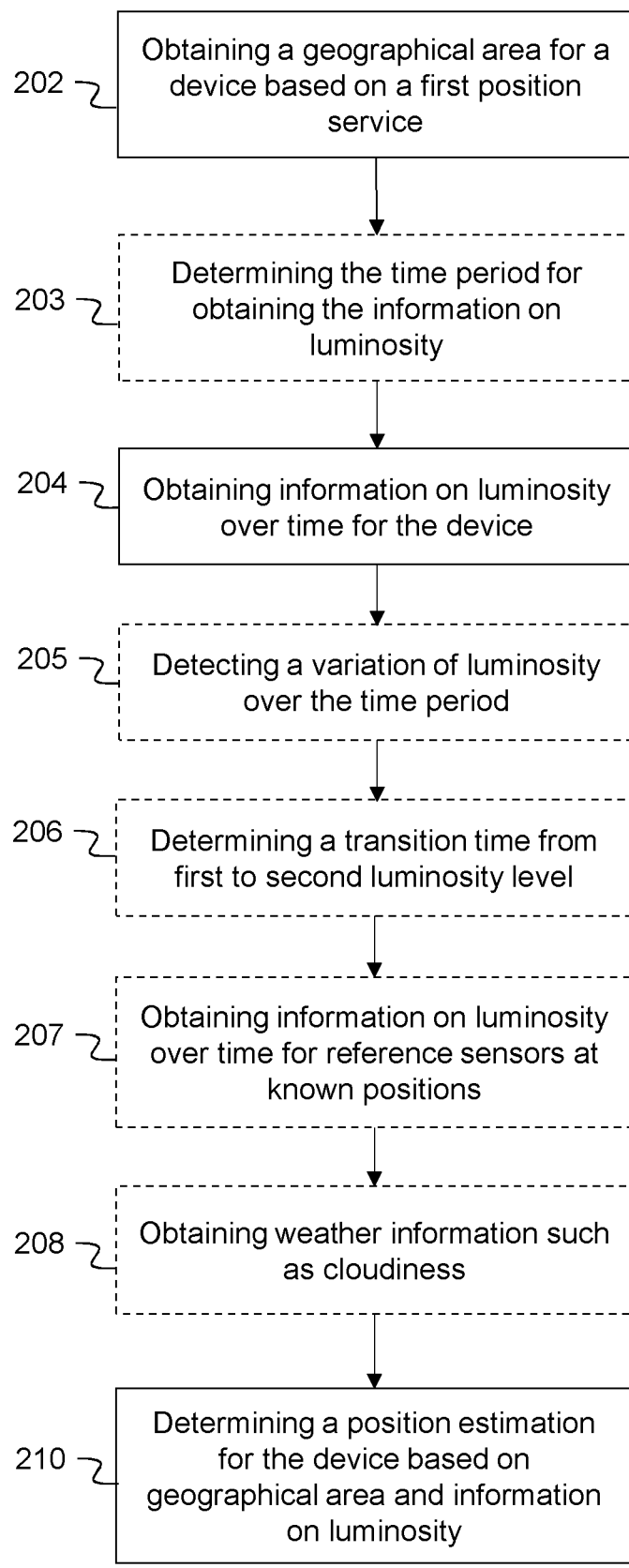
FIGS. 3 and 4 are flow charts illustrating a method performed by a system, according to possible embodiments.

FIG. 3, in conjunction with FIG. 1 or 2, describes a method performed by a system 120 for determining a position of a device 140; 170 connected to a communication network 100. The method comprises obtaining 202 a geographical area for the device based on a first position-estimation service, and obtaining 204 information on luminosity on the device over a time period. The method further comprises determining 210 a second position estimation for the device 140; 170 based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period.

That the 3D model comprises models of 3D objects of the geographical area and a model of sunlight shining onto the 3D objects over the time period signifies that the 3D model comprises a model of the sun's movement during the day and over the year, as well as a model of size and position of 3D objects in the geographical area. Hereby shadows that are cast by the 3D objects when illuminated by the sun during the time period will be modelled in the 3D model. The first position-estimation service for positioning the device determines a more or less coarse geographical area in which to look for the device. The position of the device is then determined within this determined geographical area by looking for similarities in modelled shadow changes in the model and the obtained luminosity information for the device. The second position estimation is determined by comparing the changes in luminosity obtained for the device over the time period with the modelled shadow changes for different possible positions in the 3D model within the geographical area over the time period. The position of the different possible positions that best matches the luminosity changes for the device is then determined to be the second position estimation. In such a way, an accurate positioning method is achieved. Further, the method does not need costly positioning equipment in the actual device. Therefore, it is especially useful for determining positions of small devices such as IoT devices that needs to be cost-efficient. Further advantages of such a solution are: that it allows for precise positioning of devices in an inexpensive and low power way; that it is useable when other more precise positioning methods such as GNSS are not viable, which may be the case in e.g. dense urban environments; that the solution only requires a luminosity sensor, such as a light sensor, photovoltaic cell or other type of photodiode, or a photo resistor as add-on to the device for receiving luminosity information.

The device 140, 170 is communicably connected to the communication network 100, that is, the device has a communication connectivity with the network so that it can communicate with the communication network. The device may be a wireless communication device, i.e. a UE or similar device that is arranged to communicate wirelessly with a base station of a communication network. The device is then wirelessly connected to the network. The device may also be an IoT device wirelessly connected or connected via wire to the communication network. Alternatively, the device may be a part of a base station comprising, or directly connected to, the antenna, for example a Radio Unit of a base station. The device is normally stationary, or at least the device is to be seen as stationary during a measurement period, aka time period, i.e. a Quasi-stationary device. However, the device may also be mobile. The device might be split into a "device" unit and a communication unit separated by wire. It's typically the communication unit, i.e. the unit having the antenna, which should be positioned. The device has a communication unit for sending luminosity values or luminosity information to the network, or when the system is situated in the device, for sending the second position estimation to the network. The first time period comprises except for time of day also time of year. This is to cater for e.g. changing heights over the horizon for the sun ecliptic depending on time of the year. The 3D objects are terrestrial objects, such as buildings. The system may reside for example in the device, in a network node of the communication network, such as a RAN node, a core network node, a positioning node, e.g. a Serving Mobile Location Center (SMLC), an enhanced SMLC (E-SMLC), a Location Management Function (LMF) of a wireless communication network, or in an application server of e.g. a service network, e.g. the Internet, or any of the above in combination. Alternatively, the system that performs the method may be a group of network nodes, wherein functionality for performing the method are spread out over different physical, or virtual, nodes of the network. The latter may be called a "cloud-solution".

The size of the obtained 202 geographical area depends on the position-estimation service. Preferably, the first position-estimation service is a cost-efficient and energy efficient position-estimation service. Such service is normally rather coarse. Examples of the first positon-estimation service may be information on cell-ID (CID). Other alternatives are enhanced CID. A limited geographical area where to look for the device, i.e. in which to make the second and more precise position estimation, is determined from such a first positon-estimation service. The geographical area may be for example between 0.1 km$^2$ and 10 km$^2$, however, even larger areas may be used. Information on luminosity over the time period can be actual luminosity detected by a luminosity detector, i.e. a light-sensitive sensor, such as a photo sensor, photovoltaic cell or similar, arranged on or at the device. In case the light-sensitive sensor is a photovoltaic cell, it can be used for providing power to the device, as well as for measuring luminosity. Alternatively, the information on luminosity can be determined based on detected temperature of the device, as the device temperature can be an indirect measure of luminosity. Also other similar luminosity-related information may be used.

Figure 4:
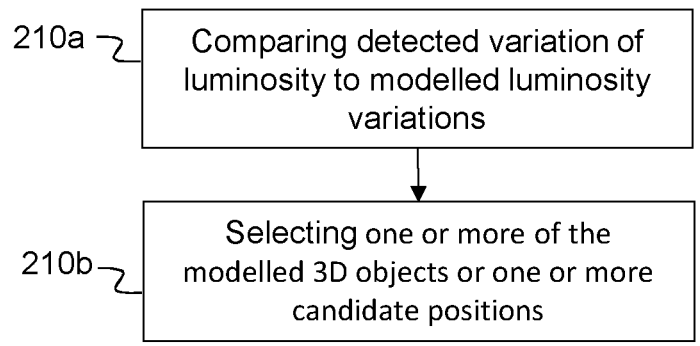

According to an embodiment, the method further comprises detecting 205 a variation of luminosity over the time period from the obtained 204 information on luminosity over the time period for the device. Further, the 3D model comprises modelled luminosity variations over the time period caused by the model of sunlight shining onto the models of the 3D objects over the time period. Also, the determining 210 of the second position estimation of the device by comparing the information on luminosity over the time period to the 3D model of the geographical area comprises comparing 210a (see FIG. 4) the detected variation of luminosity over the time period for the device to the modelled luminosity variations over the time period, and selecting 210b (see FIG. 4), based on the comparison, one or more 3D objects of the modelled 3D objects or one or more candidate positions in the 3D model for which the modelled luminosity variations over the time period best matches the detected variation of luminosity over the time period.

The variation of luminosity over the time period can be seen as a shadow signature, as the sun moves over the sky during the time period, and then a shadow cast by an object "moves". By comparing such observed luminosity variations over time to shadow signatures of objects in the model, a number of possible positions for the device can be determined. The positons may be actual positions or an information on which of the modelled 3D objects the device most probably is situated behind, based on the comparison. The shadow signature depends among others on the size of the object and the distance from the object to a position where the luminosity over the time period is detected.

According to another embodiment, the 3D model comprises modelled luminosity variations over the time period in positions of the geographical area caused by the model of sunlight shining onto the models of the 3D objects over the time period. Further, the detected variation of luminosity over the time period for the device is compared 210a to the modelled luminosity variations over the time period in the positions, and the one or more candidate positions of the positions of the geographical area are selected 210b based on the comparison.

Hereby, modelled luminosity variations in different positions of the model are compared to actual detected luminosity variations. One of the one or more of the different positions that best matches the detected luminosity variations are selected as the determined second positon estimation. The different positions may be seen as having a simulated sensor at that position, which simulated sensor would detect the luminosity variations in the model.

According to another embodiment, the detected variation of luminosity over the time period for the device is compared 210a to the modelled luminosity variations over the time period caused by the models of the 3D objects over the time period, and the one or more 3D objects of the modelled 3D objects are selected 210b based on the comparison, the second position estimation being determined to be in the vicinity of the selected one or more 3D objects.

In this way, shadow signatures of 3D objects are compared to the detect luminosity variations to determine behind which 3D object the device may be situated. The second positon estimation is then at a position behind the selected 3D object.

According to another embodiment, the method further comprises, based on the obtained 204 information on luminosity on the device over the time period, determining 206 a transition time from a first luminosity level to a second luminosity level that is substantially different from the first luminosity level. Further, the modelled luminosity variations over the time period caused by the model of sunlight shining onto the models of the 3D objects over the time period comprises transition times from the first luminosity level to the second luminosity level caused by the models of the 3D objects. Further, the comparing 210a comprises comparing the determined transition time to the transition times caused by the models of the 3D objects.

As the sun is not a point of light there will be a region of shadow where the sun is only partially obscured, called penumbra. The size of this region can be approximated to be dependent on the distance to the object obscuring it and the type of edge the object has. By profiling this transition period from direct sunlight to shadow or vice versa, i.e. from a first luminosity level to a second luminosity level that is substantially different from the first luminosity level, the position estimation of the wireless device can be further enhanced. For example, the individual 3D object which model best matches the measured transition time can be selected at the 3D object behind which the device is situated.

According to another embodiment, the method further comprises obtaining 207 information on luminosity over the time period for a number of reference sensors arranged at known geographical positions within the geographical area. Further, the second position estimation for the device is determined 210 also based on the information on luminosity from the reference sensors and the known geographical positions of the reference sensors.

By determining the second position estimation also from reference sensors at known positions, the second positon estimation can be made even more accurate. For example, the luminosity pattern over the time period at a reference sensor can be compared to the luminosity pattern observed at the device over the time period, and if there is a match, this can be used for estimating the position of the device.

According to another embodiment, the method further comprises obtaining 208 weather information such as cloudiness, and the determining 210 of the second position estimation is also based on the weather information.

For example, if the weather information shows that there is cloudy, it could be taken into consideration that the luminosity difference is less between inside a shadow from a building and outside the shadow on a cloudy day compared to on a sunny day. As another alternative, data may be excluded if weather information shows that it is cloudy and another time period is selected instead, when it is not cloudy.

According to another embodiment, the 3D model further comprises a model of sunlight reflected by any 3D object of the model or by the moon towards the geographical area. In an urban area there is often the case that sunlight fall onto a position due to reflections from other buildings, even if the position is in a shadow from direct sunlight. Such an extended model also takes such indirect/reflected sunlight into consideration, which may be missed if only direct sunlight is taken into consideration. If also taking sunlight reflections from the moon into consideration, the method can, except of at daytime, also be used on a clear night when there is considerable moonlight.

According to another embodiment, the 3D model further comprises models of artificial light sources in the geographical area, and wherein the second position estimation for the device is further determined (210) based on comparing the obtained luminosity information at the device to luminosity intensity and possibly also spectrum of the modelled artificial light sources.

Hereby, also artificial light sources such as light poles, or passing cars on a nearby road can be modelled and compared to. Observe that artificial light sources have different spectrum (more limited) than sunlight and can therefore be sorted out.

According to an embodiment, the obtaining 204 of information on luminosity on the device over a time period is received from the device.

According to another embodiment, the method further comprises determining 203 the time period for obtaining 204 the information on luminosity on the device so that the information on luminosity comprises a change in luminosity over the time period above a threshold value.

The threshold value should be set so that the change in luminosity reflects a transition from sunlight to shadow or vice versa. The time period could be set in advance based on a forecast from the 3D model of the geographical area Alternatively, luminosity values may be determined at the device over a longer second time period and the time period over which luminosity information will be obtained for the determining of the second position is a part of the second time period that comprises such a change in luminosity. As most luminosity information that can be used for positioning resides in the transitions from light to shadow, or vice versa, such a determining would enhance the second position determination. Also, the amount of data that needs to be sent from the device to the system is lower than compared to if all data over the second time period is sent. Similarly, the device can be configured with different alternatives when to report the luminosity information to the system, e.g. continuously, at a certain time, or when a threshold or condition is met, such as the threshold value discussed above.

According to another embodiment, the information on luminosity on the device may reported by the device to the system in different ways. According to one embodiment, the information on luminosity may be reported periodically e.g. for a whole time period or for parts of a time period. According to another embodiment, the reporting may be event-based. For example, when a predetermined threshold or condition is met for the luminosity value, information on luminosity over a time period containing the time when the threshold or condition is met is sent to the system. Further, data from periodic reporting can be added to the determined luminosity variations essentially directly and also makes it easier to compare against modelled luminosity variations. Event based reporting is useful to minimize the signaling between the device and the system. Also, the system may configure the device to perform periodic or event-based reporting.

Figure 5:
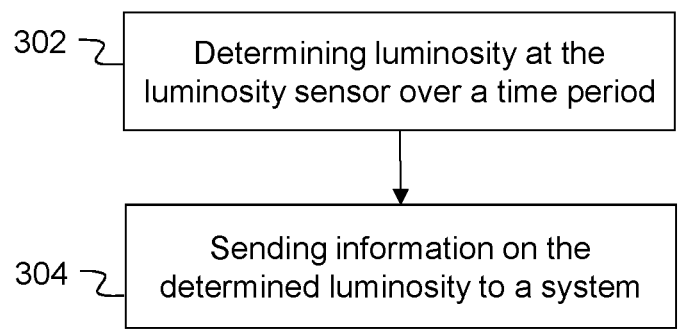
FIG. 5 is a flow chart illustrating a method performed by a device, according to possible embodiments.

FIG. 5, in conjunction with FIG. 1 or 2, describes a position-determining method performed by a communication device 140; 170 connected to a communication network 100, the communication device 140; 170 having a luminosity sensor. The method comprises determining 302 luminosity at the luminosity sensor over a time period, and sending 304 information on the determined luminosity over the time period to a system connected to the communication network, wherein the determined and sent information on luminosity is suitable for determining a position of the communication device.

The information on luminosity that is sent to the system may be actual luminosity values or any information related to the luminosity values. That the information on luminosity sent to the system is suitable for determining a position of the device includes that the information on luminosity comprises a plurality of luminosity values taken over time so that a change in luminosity can be determined over a defined time period. The system connected to the communication network to which the information on the determined luminosity is sent may be a positioning system, such as a positioning server or positioning node.

According to an embodiment, the information on luminosity on the device 140; 170 that is sent 304 to the system comprises a change in luminosity over the time period above a threshold value.

Figure 6:
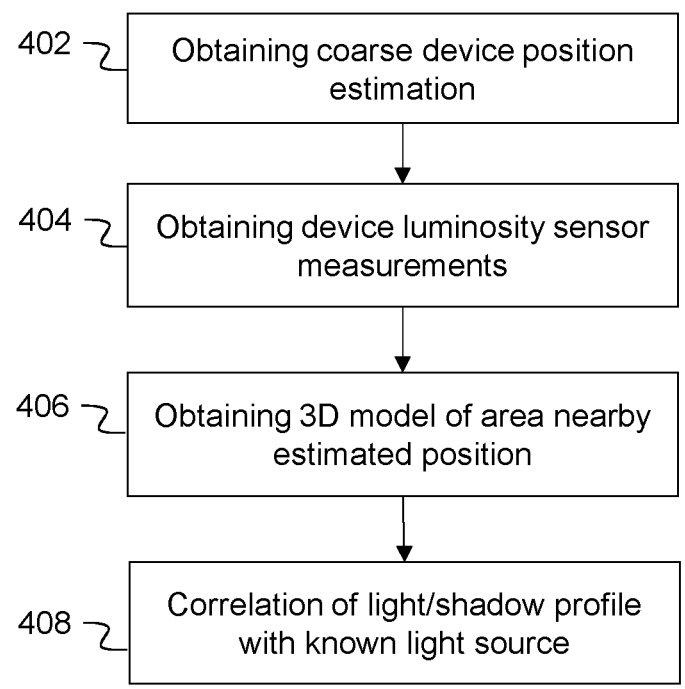
FIG. 6 is a flow chart illustrating another method performed by a system, according to possible embodiments.

Here follows a description of other embodiments of the invention, with reference to FIG. 6. Firstly, an already existing positioning method, such as CID, is used to obtain 402 a coarse estimation of the position of the device. This estimation will likely be off up to hundreds of meters, depending on the accuracy of the method used and the environmental conditions. For example, CID provides typically 150 meters or coarser. Once the coarse position estimation has been obtained, a node or system e.g. in the communication network, starts obtaining 404 luminosity information from luminosity sensors on the device, or some other sensor that obtains information correlated with luminosity. An example of another sensor is a temperature sensor, as temperature in the device will raise when exposed to direct sunlight, and thus can be used as an indirect, however probably less accurate source of information of luminosity. The sensors can be configured to collect data continuously, or only at given times. Sparse measurement can be used to reduce the power requirements of on the device. Reasons for not collecting measurements are: dense cloud cover causing diffuse light; night time, or assumption that the device is in a shadow area from a large object and thus excessive measurement will be redundant.

Further, a 3D model is obtained 406 of a geographical area covering the estimated 402 coarse position. Such a 3D model can be built up separately for this purpose or existing 3D models may be used. 3D models of terrain, buildings and trees are rather common and complete today, and it is possible to foresee that those databases will increase in number and completeness in the upcoming years. An example of a database with existing 3D models is Google® Earth, see https://www.google.com/earth/. The obtained 3D model comprises models of 3D objects of the geographical area as well as a model of sunlight shining onto the models of the 3D objects over time. The obtained luminosity information over a time period detected by the sensors at the device is then compared to the modelled luminosity variations over the same time period of the 3D model of the geographical area in order to obtain correlations 408 of light/shadow profiles in the model with the obtained luminosity information. When there is a correlation for a position in the 3D model or with a 3D object in the 3D model, this position is a candidate position of the device, or this 3D object is a candidate object behind which the device is situated.

Figure 7:
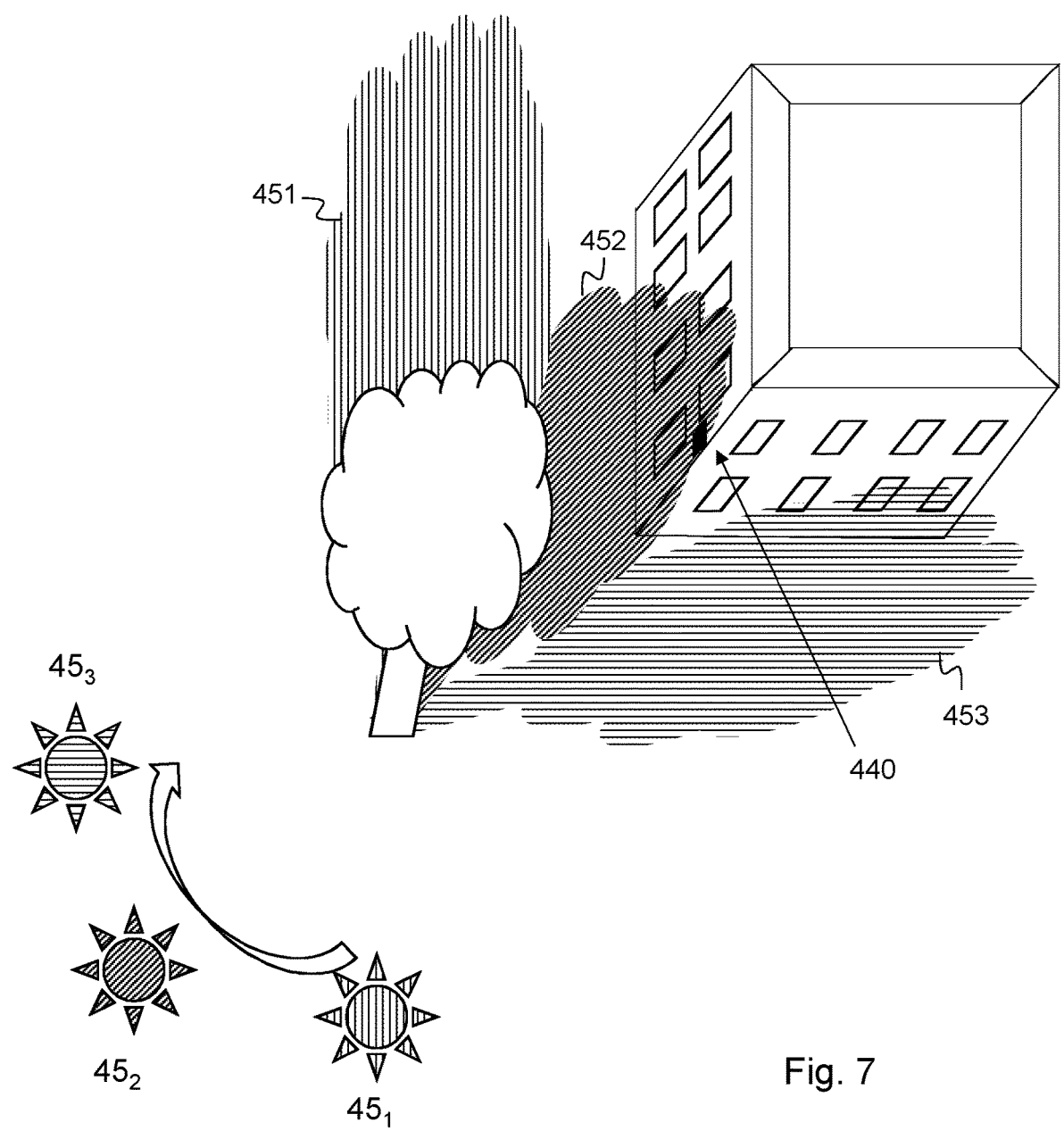
FIG. 7 is a perspective view of a geographical area and a model of the sun's movement and the shadow cast by an object due to sunlight.

FIG. 7 shows an example of a geographical area and how the sun moves from a first position 451, in which a shadow cast by a tree 450 is situated in a first position $45_1$, to a second position 452, in which the shadow cast by the tree 450 is in a second position $45_2$, and finally into a third position $45_3$, moves from a first position 451 in which the sun is at a first sun position, into a second position 452, in which the shadow cast by the tree 450 is in a third position $45_3$. Further, in the second shadow position 452 a device 440, which in this case is an antenna of a base station, is situated in the shadow. The device 440, which according to the invention is equipped with a luminosity-related sensor, then determines a lower luminosity than in the first and third shadow position.

According to an embodiment, luminosity information from the device that is to be positioned can be correlated or classified with luminosity information of one or multiple reference sensors arranged at known positions within the geographical area. Further, a correlation can be performed between the received luminosity information of the device and luminosity information of the reference sensors in order to determine the position of the device.

According to another embodiment, which may be combined with the above, simulated devices in different positions of the 3D model of the geographical area are used, and a correlation is determined between the received luminosity information of the device and simulated luminosity variations in the model at positions in the model for such simulated devices.

In another embodiment, which may be combined with any of the above, luminosity information from the device to be positioned can be used to create a series of possible obstacles that would cause an observed shadow signature (i.e. a change in luminosity over time). Based on this information, a series of possible locations for the device can be derived.

Figure 8:
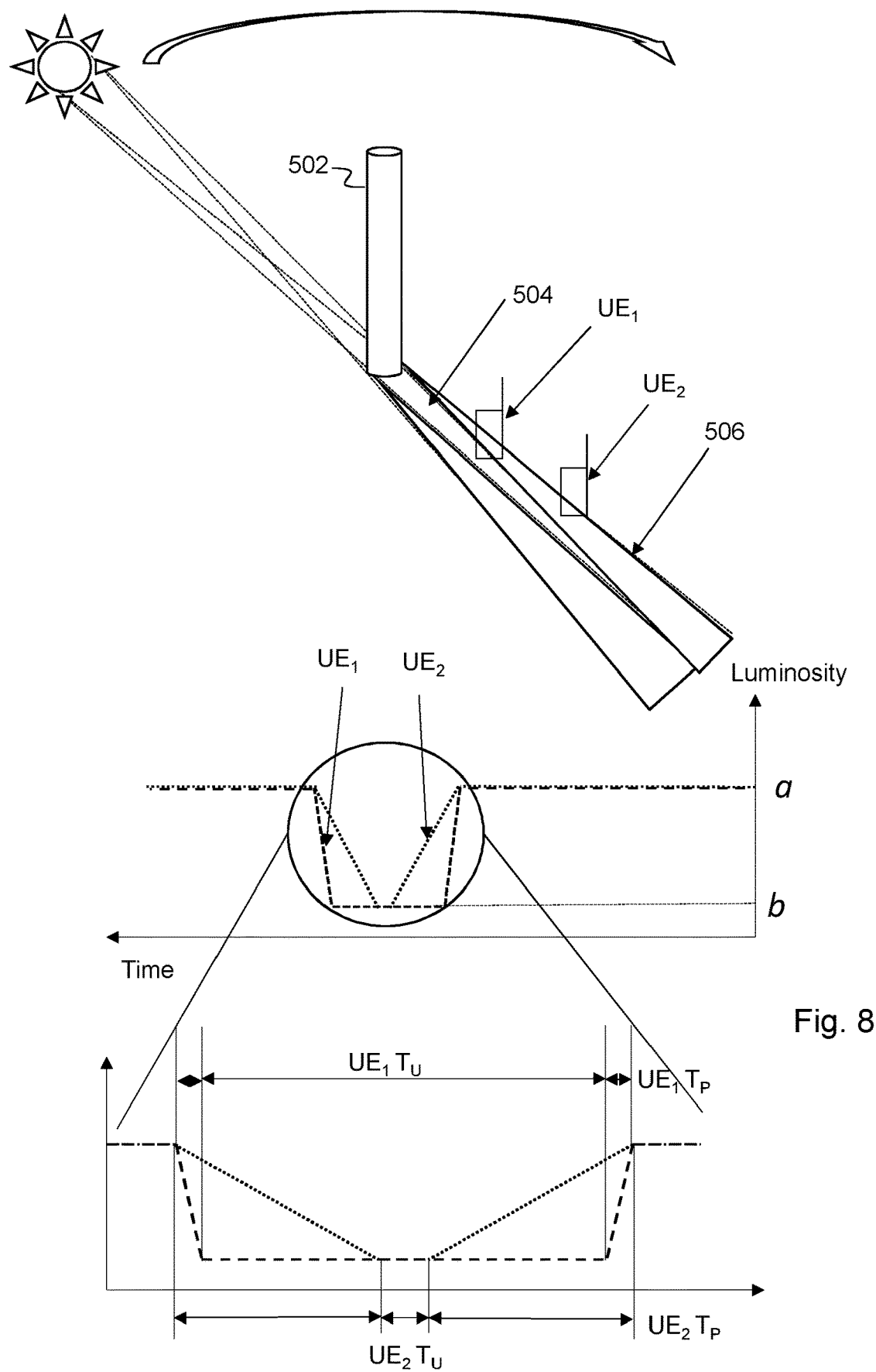
FIG. 8 is a schematic illustration of variation in luminosity in direct sunlight compared to in different amounts of shadow behind an object.

A shadow signature may be determined, for example, by measuring the transition time from light to shadow, i.e. from a high luminosity value to a low luminosity value that is considerably lower than the high value, e.g. from a value above a first threshold to a value below a second threshold lower than the first threshold. As the sun is not a point source of light, there will be a region of the shadow where the sun is only partially obscured. This is described in FIG. 8, in which an object 502 in the shape of a standing rod is enlightened by the sun. A first region 504 behind the object 502 where the sun is completely obscured is called umbra. A second region 506 behind the object 502 where the sun is only partially obscured is called penumbra. The size of this second region 506 at a certain position behind the object can be approximated to be dependent to the distance between the certain position and the object 502, and the type of edge the object 502 has. By profiling the transition period, further enhancements in the position estimation can be achieved by calculating the distance between the device and the object causing the shadow. This is described in the lower part of FIG. 8. A first UE, $UE_1$, is positioned at a first distance from the object 502, whereas a second UE, $UE_2$, is positioned at a second distance from the object, which second distance is larger than the first distance. As seen in the diagram of the lower part of FIG. 1, the change from a high luminosity level a at direct sunlight to a low luminosity level b in the umbra, and vice versa, goes quicker for $UE_1$ than for $UE_2$, as the penumbra 506 is larger the further away from the object 502. Further, in the lowest part of FIG. 8, the time for the $UE_1$ being in the umbra, called $UE_1\ T_U$, i.e. the UE being at a more or less constant low luminosity level, the time for the $UE_1$ being in the penumbra, called $UE_1\ T_P$, i.e. changing from high luminosity level a to low luminosity level b, as well as the corresponding times for the second UE, $UE_2\ T_U$ and $UE_1\ T_P$ can be determined from the obtained luminosity levels and time points for those measurements. Such determined times can then be used in order to determine in which distance from the object the respective UE is situated, i.e. to determine the first distance and the second distance.

The result from any of the different embodiments described above may be a set of possible device positions with associated probabilities. At this point, the method can be concluded, or additional measurements can be requested from the device to improve the convergence and/or accuracy by iterating the method.

According to another embodiment, artificial lights can be taken into consideration, such as light from light poles. The received light intensity from such artificial lights can be used to further enhance estimation of the device position. Also, according to another embodiment, the information from artificial lights can be combined with angle/accelerometer date to distinguish between light sources. The artificial light sources can be stationary or dynamic, e.g. lights of a car driving down a road at night, and they can be detected by other light sensors or other processes as well as the same sensor.

Once the device position has been estimated, verification that the position has not changed over time can be achieved by performing measurement during relevant transitions times.

According to an embodiment, the method can be used for both stationary devices and mobile devices.

Moving objects can cause, under certain conditions, well defined moving shadow patterns on the ground, e.g. in the case of clouds, drones or airplanes for example. These shadows will vary in time for a location, per wind or other phenomena. These shadows can be an addition to the embodiments described above.

According to another embodiment, a network of devices capable of detecting such a change in luminosity, together with a known luminosity profile for each of the devices can be used to estimate the path of shadows and use it to find the location of other devices, if the devices are quasi-stationary or with a known speed or relative path, e.g. gyroscope controlled navigation.

The sensors can be installed to measure omni-directionally or directionally. This directional measurement can be used to calibrate the direction of the device from an object by pointing at its own shadow in a wall, for example a shadow of a known pole or mast or similar.

The sensors can be composed of a single sensor, or an array of sensors, pointing in one or multiple directions, and being sensitive to one or multiple frequencies of light, or the overall power received (like in the case of photo resistors).

In the case of the sensors being able to detect multiple frequencies of light, or multiple directions, this can be used to detect the source of the light. For example, to decide if the light is originating from the sun or a light pole.

In the case of wireless communication networks, one embodiment is that the device provides the luminosity information to the network for the network to process the information. This is done, for example, in the RBS, in an E-SMLC or a Mobility Management Entity (MME), or any other network node. The node can be a virtual node, for example in the case the computation is performed in the device itself, via preconfigured information/model or from data provided by the network.

The device can provide data from its sensors to the network continuously, or in a condensed manner. If condensed, the data can be compressed both in time and range. The device can be configured to only report on change or trigger, certain intervals, or combination or both.

According to another embodiment, the luminosity information can comprise information derived from it, for example a change of temperature derived from the device being in the sunlight.

Further, luminosity information and/or the 3D model may be included in 3GPP specifications of wireless communication networks. The 3D model may be included as a set of points indicating polygons, vertex and/or shapes of objects. Information Elements (IEs) can be added to or modified in certain messages to allow transfer of this type of information between nodes and devices in the network.

In the case of LTE Positioning Protocol annex (LPPa) or NR Positioning Protocol annex (NRPPa) protocols, a set of possible, but not limited to, IE:s where this information can be added are:

Enhanced UMTS Terrestrial Radio Access Networks (E-UTRAN) Access Point Sensor Data IE in the
   a. E-UTRAN Access Point Position IE in the i. E-CID Measurement Result IE of the LPPa/NRPPa messages E-CID MEASUREMENT INITIATION RESPONSE and E-CID MEASUREMENT REPORT.
ii. CHOICE Observed Time Difference of Arrival (OT-DOA) Cell Information Item IE list in the OTDOA Cell Information IE lists OTDOA Cells and Additional OTDOA Cells in the LPPa/NRPPa message OTDOA MEASUREMENT RESPONSE.
b. Sensor data Cell information Item IE list in the
i. LPPa message Uplink Time Difference Of Arrival (UTDOA) INFORMATION RESPONSE
ii. LPPa message UTDOA INFORMATION UPDATE
iii. LPPa message ASSISTANCE INFORMATION CONTROL.
iv. LPPa message ASSISTANCE INFORMATION FEEDBACK.
v. LPPa message PRIVATE MESSAGE
c. Sensor Data Cell Information Item IE In the case of LPP protocol, below are examples:
Sensor Location Information Elements
Sensor-MeasurementInformation The IE Sensor-MeasurementInformation can be used by the target device to provide UE sensor measurements to the location server.
Sensor Location Information Request
Sensor-RequestLocationInformation The IE Sensor-RequestLocationInformation can be used by the location server to request location information for sensor-based methods from a target device.
Sensor-AssistanceDataList The IE Sensor-AssistanceDataList can be used by the location server to provide the Sensor specific assistance data to the UE.

Figure 9:
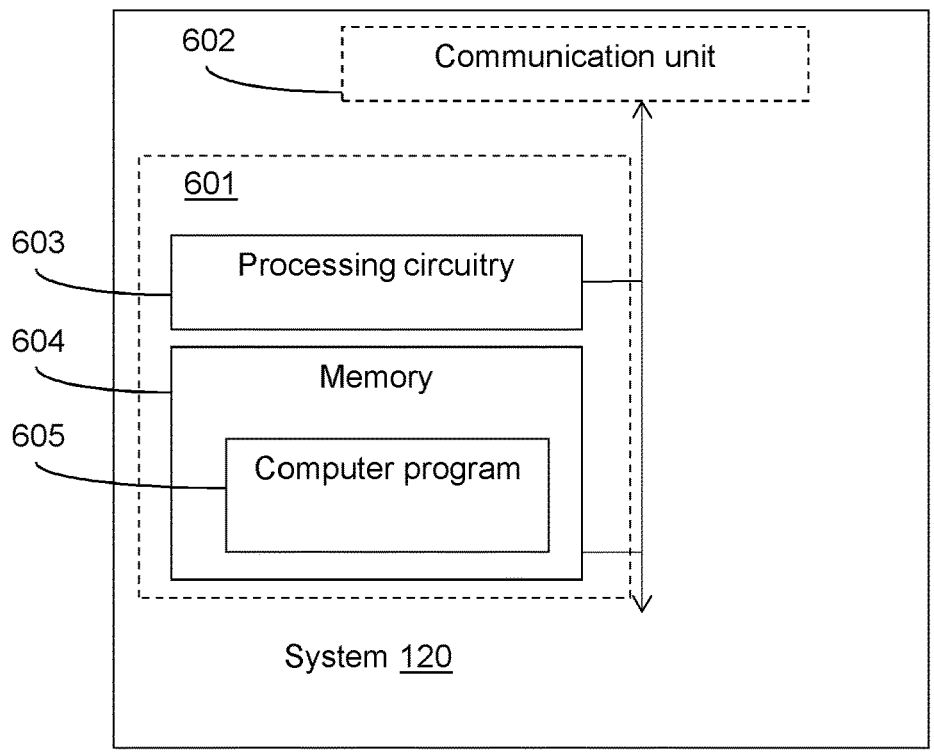
FIG. 9 is a schematic block diagram of a system, according to embodiments.

FIG. 9, in conjunction with FIG. 1 or 2, shows a system 120 configured for determining a position of a device 140; 170 connected to a communication network 100. The system 120 comprising a processing circuitry 603 and a memory 604. The memory contains instructions executable by said processing circuitry, whereby the system 120 is operative for obtaining a geographical area for the device based on a first position-estimation service, obtaining information on luminosity on the device over a time period, and determining a second position estimation for the device 140; 170 based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period.

The system 120 may reside for example in the device, in a network node of the communication network, such as a RAN node, a core network node, a positioning node, e.g. a Serving Mobile Location Center (SMLC), an enhanced SMLC (E-SMLC), a Location Management Function (LMF) of a wireless communication network, or in an application server of e.g. a service network, e.g. the Internet, or any of the above in combination. Alternatively, the system 120 may be a group of network nodes, wherein functionality for performing the method are spread out over different physical, or virtual, nodes of the network. The latter may be called a "cloud-solution".

According to an embodiment, the system is further operative for detecting a variation of luminosity over the time period from the obtained information on luminosity over the time period for the device, wherein the 3D model comprises modelled luminosity variations over the time period caused by the model of sunlight shining onto the models of the 3D objects over the time period. Further, the system is operative for the determining of the second position estimation of the device by comparing the information on luminosity over the time period to the 3D model of the geographical area by comparing the detected variation of luminosity over the time period for the device to the modelled luminosity variations over the time period, and selecting, from the comparison, one or more 3D objects of the modelled 3D objects or one or more candidate positions in the 3D model for which the modelled luminosity variations over the time period best matches the detected variation of luminosity over the time period.

According to an embodiment, the 3D model comprises modelled luminosity variations over the time period in positions of the geographical area caused by the model of sunlight shining onto the models of the 3D objects over the time period. Further, the system is operative for comparing the detected variation of luminosity over the time period for the device to the modelled luminosity variations over the time period in the positions, and for selecting the one or more candidate positions of the positions of the geographical area based on the comparison.

According to another embodiment, the system is operative for comparing the detected variation of luminosity over the time period for the device to the modelled luminosity variations over the time period caused by the models of the 3D objects over the time period, and for selecting the one or more 3D objects of the modelled 3D objects based on the comparison, the second position estimation being determined to be in the vicinity of the selected one or more 3D objects.

According to another embodiment, the system is further operative for determining a transition time from a first luminosity level to a second luminosity level that is substantially different from the first luminosity level, based on the obtained information on luminosity on the device over the time period. Further, the modelled luminosity variations over the time period caused by the model of sunlight shining onto the models of the 3D objects over the time period comprises transition times from the first luminosity level to the second luminosity level caused by the models of the 3D objects. Also, the system is operative for the comparing of the detected variation of luminosity over the time period for the device to the modelled luminosity variations over the time period by comparing the determined transition time to the transition times caused by the models of the 3D objects.

According to another embodiment, the system is further operative for obtaining information on luminosity over the time period for a number of reference sensors arranged at known geographical positions within the geographical area. Further, the system is operative for determining the second position estimation for the device also based on the information on luminosity from the reference sensors and the known geographical positions of the reference sensors.

According to another embodiment, the system is further operative for obtaining weather information such as cloudiness. Further, the system is operative for determining the second position estimation for the device also based on the weather information.

According to yet another embodiment, the 3D model further comprises a model of sunlight reflected by any 3D object of the model or by the moon towards the geographical area.

According to yet another embodiment, the 3D model further comprises models of artificial light sources in the geographical area. Further, the system is operative for determining the second position estimation for the device based on comparing the obtained luminosity information at the device to luminosity intensity and possibly also spectrum of the modelled artificial light sources.

According to still another embodiment, the system is further operative for determining the time period for obtaining the information on luminosity on the device so that the information on luminosity comprises a change in luminosity over the time period above a threshold value According to other embodiments, the system 120 may further comprise a communication unit 602, which may be considered to comprise conventional means for wireless communication with parts of the communication system such as the device, in case the system is not situated in the device, and with other parts of the communication system. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the system 120 to perform the steps described in any of the described embodiments of the system 120 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the system 120 has access via the communication unit 602. The computer program 605 may then be downloaded from the server into the memory 604.

Figure 10:
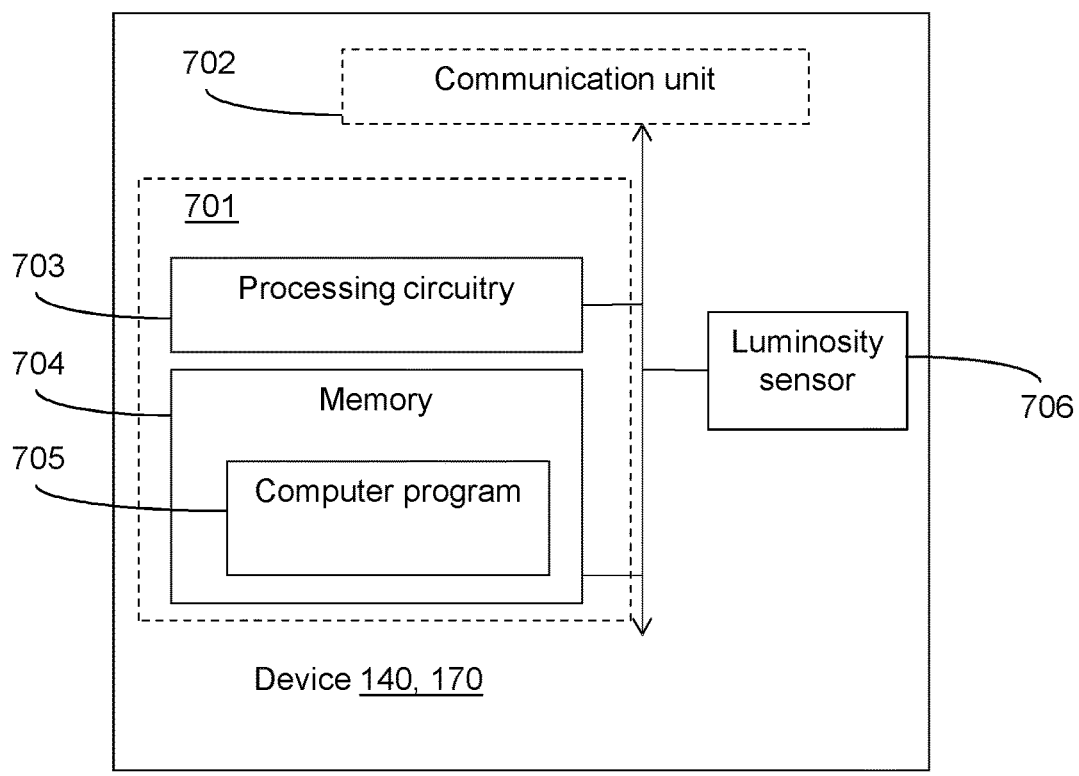
FIG. 10 is a schematic block diagram of a device, according to embodiments.

FIG. 10 describes a communication device 140; 170 configured for connection to a communication network 100, the communication device 140; 170 having a luminosity sensor 706. The communication device 140; 170 comprises a processing circuitry 703 and a memory 704. The memory contains instructions executable by said processing circuitry, whereby the communication device 140; 170 is operative for determining luminosity at the luminosity sensor 706 over a time period, and sending information on the determined luminosity over the time period to a system connected to the communication network, wherein the determined and sent information on luminosity is suitable for determining a position of the communication device. The communication network may be a wireless communication network. The system connected to the communication network to which the information on the determined luminosity is sent may be a positioning system, such as a positioning server or positioning node. The system may or may not be a part of the communication network.

According to an embodiment, the communication device 140; 170 is operative for sending the information on luminosity on the device 140; 170 to the system with the information comprising a change in luminosity over the time period above a threshold value.

According to other embodiments, the communication device 140; 170 may further comprise a communication unit 702, which may be considered to comprise conventional means for communication with the wireless communication devices network 100. In case the communication device 140, 170 is a wireless communication device such as a UE, the communication unit 702 comprises wireless communication means such as a transceiver for wireless transmission and reception of signals from and to a radio access network node of the network. In case the device is a DU 170 or other unit directly connected to an antenna of a radio access network node, the communication unit 702 may comprise conventional means for communication with other radio access network nodes of the wireless communication network 100, such as a CU 180. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the communication deice 140, 170 to perform the steps described in any of the described embodiments of the communication device 140; 170 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the communication device 140; 170 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a system for determining a position of a device connected to a communication network, the method comprising:
   obtaining a geographical area for the device based on a first position-estimation service;
   obtaining information on luminosity on the device over a time period; and
   determining a second position estimation for the device based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period.

2. The method according to claim 1, further comprising:
   detecting a variation of luminosity over the time period from the obtained information on luminosity over the time period for the device,
   wherein the 3D model comprises modelled luminosity variations over the time period caused by the model of sunlight shining onto the models of the 3D objects over the time period, and
   wherein the determining of the second position estimation of the device by comparing the information on luminosity over the time period to the 3D model of the geographical area comprises:
      comparing the detected variation of luminosity over the time period for the device to the modelled luminosity variations over the time period, and
      selecting, from the comparison, one or more 3D objects of the modelled 3D objects or one or more candidate positions in the 3D model for which the modelled luminosity variations over the time period best matches the detected variation of luminosity over the time period.

3. The method according to claim 2, wherein the 3D model comprises modelled luminosity variations over the time period in positions of the geographical area caused by the model of sunlight shining onto the models of the 3D objects over the time period, and wherein the detected variation of luminosity over the time period for the device is compared to the modelled luminosity variations over the time period in the positions, and the one or more candidate positions of the positions of the geographical area are selected based on the comparison.

4. The method according to claim 2, wherein the detected variation of luminosity over the time period for the device is compared to the modelled luminosity variations over the time period caused by the models of the 3D objects over the time period, and the one or more 3D objects of the modelled 3D objects are selected based on the comparison, the second position estimation being determined to be in the vicinity of the selected one or more 3D objects.

5. The method according to claim 2, further comprising:
   based on the obtained information on luminosity on the device over the time period, determining a transition time from a first luminosity level to a second luminosity level that is substantially different from the first luminosity level,
   and wherein the modelled luminosity variations over the time period caused by the model of sunlight shining onto the models of the 3D objects over the time period comprises transition times from the first luminosity level to the second luminosity level caused by the models of the 3D objects, and wherein the comparing comprises comparing the determined transition time to the transition times caused by the models of the 3D objects.

6. The method according to claim 1, further comprising:
   obtaining information on luminosity over the time period for a number of reference sensors arranged at known geographical positions within the geographical area,
   wherein the second position estimation for the device is determined also based on the information on luminosity from the reference sensors and the known geographical positions of the reference sensors.

7. The method according to claim 1, further comprising obtaining weather information, wherein the determining of the second position estimation for the device is also based on the weather information.

8. The method according to claim 1, wherein the 3D model further comprises a model of sunlight reflected by any 3D object of the model or by the moon towards the geographical area.

9. The method according to claim 1, wherein the 3D model further comprises models of artificial light sources in the geographical area, and wherein the second position estimation for the device is further determined based on comparing the obtained luminosity information at the device to luminosity intensity and spectrum of the modelled artificial light sources.

10. The method according to claim 1, further comprising determining the time period for obtaining the information on luminosity on the device so that the information on luminosity comprises a change in luminosity over the time period above a threshold value.

11. A position-determining method performed by a communication device connected to a communication network, the communication device having a luminosity sensor, the method comprising:
   determining luminosity at the luminosity sensor over a time period; and
   sending information on the determined luminosity over the time period to a system connected to the communication network, wherein the determined and sent information on luminosity is suitable for determining a position of the communication device, wherein the information indicates that the luminosity at the luminosity sensor changed by at least a threshold value over the time period so as to reflect a transition between sunlight and shadow at the luminosity sensor over the time period.

12. The position-determining method according to claim 11, wherein the information on luminosity on the device that is sent to the system comprises a change in luminosity over the time period above a threshold value.

13. A system configured for determining a position of a device connected to a communication network, the system comprising a processing circuitry and a memory, said memory containing instructions executable by said processing circuitry, whereby the system is configured to:
   obtain a geographical area for the device based on a first position-estimation service;
   obtain information on luminosity on the device over a time period; and
   determine a second position estimation for the device based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period.

14. The system according to claim 13, further configured to detect a variation of luminosity over the time period from the obtained information on luminosity over the time period for the device, wherein the 3D model comprises modelled luminosity variations over the time period caused by the model of sunlight shining onto the models of the 3D objects over the time period, and wherein the system is configured to determine the second position estimation of the device by comparing the information on luminosity over the time period to the 3D model of the geographical area by:

comparing the detected variation of luminosity over the time period for the device to the modelled luminosity variations over the time period, and selecting, from the comparison, one or more 3D objects of the modelled 3D objects or one or more candidate positions in the 3D model for which the modelled luminosity variations over the time period best matches the detected variation of luminosity over the time period.

15. The system according to claim 14, wherein the 3D model comprises modelled luminosity variations over the time period in positions of the geographical area caused by the model of sunlight shining onto the models of the 3D objects over the time period, the system configured to compare the detected variation of luminosity over the time period for the device to the modelled luminosity variations over the time period in the positions, and to select the one or more candidate positions of the positions of the geographical area based on the comparison.

16. The system according to claim 14, configured to compare the detected variation of luminosity over the time period for the device to the modelled luminosity variations over the time period caused by the models of the 3D objects over the time period, and to select the one or more 3D objects of the modelled 3D objects based on the comparison, the second position estimation being determined to be in the vicinity of the selected one or more 3D objects.

17. The system according to claim 14, further configured to:

based on the obtained information on luminosity on the device over the time period, determine a transition time from a first luminosity level to a second luminosity level that is substantially different from the first luminosity level, wherein the modelled luminosity variations over the time period caused by the model of sunlight shining onto the models of the 3D objects over the time period comprises transition times from the first luminosity level to the second luminosity level caused by the models of the 3D objects;

wherein the system is configured to compare the detected variation of luminosity over the time period for the device to the modelled luminosity variations over the time period by comparing the determined transition time to the transition times caused by the models of the 3D objects.

18. The system according to claim 13, further configured to:

obtain information on luminosity over the time period for a number of reference sensors arranged at known geographical positions within the geographical area, and wherein the system is configured to determine the second position estimation for the device also based on the information on luminosity from the reference sensors and the known geographical positions of the reference sensors.

19. The system according to claim 13, further configured to obtain weather information, wherein the system is configured to determine the second position estimation for the device also based on the weather information.

20. The system according to claim 13, wherein the 3D model further comprises a model of sunlight reflected by any 3D object of the model or by the moon towards the geographical area.

21. The system according to claim 13, wherein the 3D model further comprises models of artificial light sources in the geographical area, and wherein the system is configured to determine the second position estimation for the device based on comparing the obtained luminosity information at the device to luminosity intensity and spectrum of the modelled artificial light sources.

22. The system according to claim 13, further configured to determine the time period for obtaining the information on luminosity on the device so that the information on luminosity comprises a change in luminosity over the time period above a threshold value.

23. A communication device configured for connection to a communication network, the communication device comprising:

a luminosity sensor; and a processing circuitry and a memory, said memory containing instructions executable by said processing circuitry, whereby the communication device is configured to:

determine luminosity at the luminosity sensor over a time period, and send information on the determined luminosity over the time period to a system connected to the communication network, wherein the determined and sent information on luminosity is suitable for determining a position of the communication device, wherein the information indicates that the luminosity at the luminosity sensor changed by at least a threshold value over the time period so as to reflect a transition between sunlight and shadow at the luminosity sensor over the time period.

24. Communication device according to claim 23, configured to send the information on luminosity on the device to the system with the information comprising a change in luminosity over the time period above a threshold value.

25. The communication device according to claim 23, wherein the luminosity sensor is configured to perform a directional measurement of luminosity of a shadow formed from the sun, wherein the shadow is:

a shadow of the communication device;

a shadow of a structure to which the communication device is mounted; or a shadow of an object known to the system.

26. The communication device according to claim 23, wherein the luminosity sensor is configured to selectively detect luminosity from one or more frequencies of light that are specific to the sun.

27. The communication device according to claim 23, wherein the information indicates the time period over which the luminosity at the luminosity sensor changed by at least the threshold value, wherein the position of the communication device is determinable as a function of the time period.

28. A non-transitory computer-readable storage medium on which is stored a computer program comprising instructions, which, when executed by at least one processing circuitry of a system for determining a position of a device connected to a communication network, causes the system to:

obtain a geographical area for the device based on a first position-estimation service;

obtain information on luminosity on the device over a time period, and determine a second position estimation for the device based on the geographical area and on the information on luminosity, by comparing the information on luminosity over the time period to a 3D model of the geographical area, the 3D model comprising models of 3D objects of the geographical area and a model of sunlight shining onto the models of the 3D objects over the time period.

29. A non-transitory computer-readable storage medium on which is stored a computer program comprising instructions, which, when executed by at least one processing circuitry of a communication device configured for connection to a communication network, causes the communication device to:

determine luminosity at the luminosity sensor over a time period, and send information on the determined luminosity over the time period to a system connected to the communication network, wherein the determined and sent information on luminosity is suitable for determining a position of the communication device, wherein the information indicates that the luminosity at the luminosity sensor changed by at least a threshold value over the time period so as to reflect a transition between sunlight and shadow at the luminosity sensor over the time period.

* * * * *

UNITED STATES PATENT AND TRADEMARK OFFICE
CERTIFICATE OF CORRECTION

PATENT NO. : 12,228,668 B2
APPLICATION NO. : 17/762114
DATED : February 18, 2025
INVENTOR(S) : Gonzalez Escudero et al.

It is certified that error appears in the above-identified patent and that said Letters Patent is hereby corrected as shown below:

In the Specification

In Column 5, Line 13, delete "equipped" and insert -- equipment --, therefor.

In Column 6, Line 42, delete "positon-estimation" and insert -- position-estimation --, therefor.

In Column 6, Lines 46-47, delete "positon-estimation" and insert -- position-estimation --, therefor.

In Column 7, Line 18, delete "positons" and insert -- positions --, therefor.

In Column 7, Line 38, delete "positon" and insert -- position --, therefor.

In Column 7, Line 51, delete "detect" and insert -- detected --, therefor.

In Column 7, Line 53, delete "positon" and insert -- position --, therefor.

In Column 8, Line 22, delete "positon" and insert -- position --, therefor.

In Column 10, Line 12, delete "raise" and insert -- rise --, therefor.

In Column 10, Line 14, delete "information of" and insert -- information on --, therefor.

In Column 10, Line 17, delete "of on" and insert -- of --, therefor.

In Column 11, Line 63, delete "date" and insert -- data --, therefor.

In Column 15, Line 9, delete "value" and insert -- value. --, therefor.

In Column 16, Line 33, delete "deice" and insert -- device --, therefor.

Signed and Sealed this
Twelfth Day of August, 2025

Coke Morgan Stewart
*Acting Director of the United States Patent and Trademark Office*

In the Claims

In Column 17, Line 65, in Claim 5, delete "and" and insert the same at Line 64, after "level,", as a continuation sub-point.

In Column 20, Line 46, in Claim 24, delete "Communication" and insert -- The communication --, therefor.

In Column 21, Line 11, in Claim 28, delete "period," and insert -- period; --, therefor.